No. 634,997. Patented Oct. 17, 1899.
J. J. ROGERS & O. S. KENNEDY.
SEEDING ATTACHMENT FOR DISK HARROWS.
(Application filed Nov. 12, 1898.)

(No Model.) 2 Sheets—Sheet 1.

Witnesses
J. Rauf Culverwell.
Chas. S. Hyer.

Jonathan Judson Rogers, Inventors
Oliver Sylvester Kennedy,
By their Attorneys,
C. A. Snow & Co.

THE NORRIS PETERS CO., PHOTO-LITHO., WASHINGTON, D. C.

No. 634,997. Patented Oct. 17, 1899.
J. J. ROGERS & O. S. KENNEDY.
SEEDING ATTACHMENT FOR DISK HARROWS.
(Application filed Nov. 12, 1898.)
(No Model.) 2 Sheets—Sheet 2.
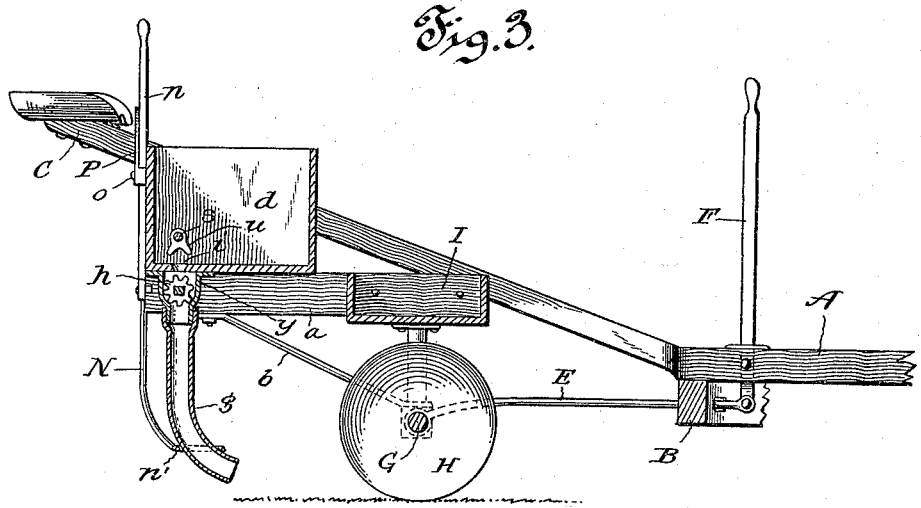
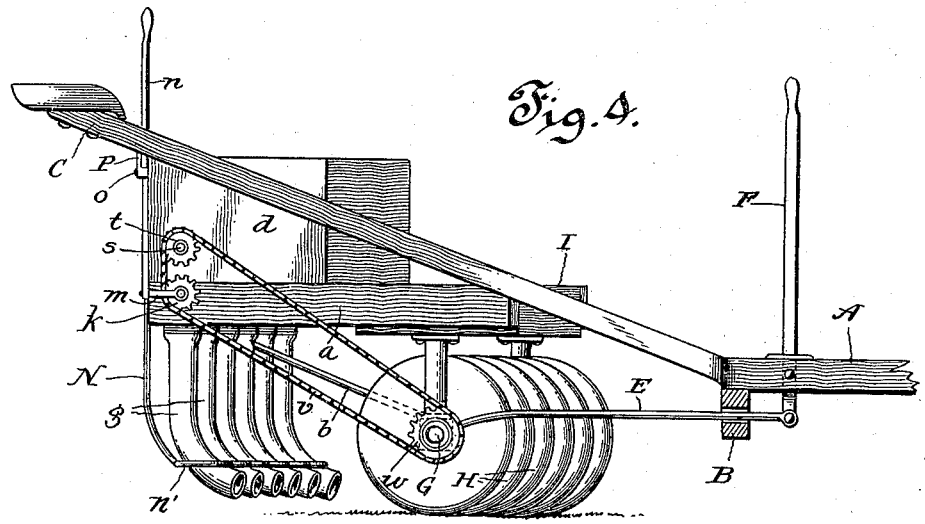

UNITED STATES PATENT OFFICE.

JONATHAN JUDSON ROGERS AND OLIVER SYLVESTER KENNEDY, OF FORT WORTH, TEXAS.

SEEDING ATTACHMENT FOR DISK HARROWS.

SPECIFICATION forming part of Letters Patent No. 634,997, dated October 17, 1899.

Application filed November 12, 1898. Serial No. 696,320. (No model.)

*To all whom it may concern:*

Be it known that we, JONATHAN JUDSON ROGERS and OLIVER SYLVESTER KENNEDY, citizens of the United States, residing at Fort Worth, in the State of Texas, have invented certain new and useful Improvements in Seeding Attachments for Disk Harrows; and we hereby declare that the following is a full, clear, and exact specification of the same.

Our invention relates to seeding attachments for disk harrows; and the same is designed more particularly as an improvement upon the structure disclosed by Letters Patent No. 406,147, issued to us jointly on July 2, 1889.

The object of the present improvements is to simplify the construction, promote the efficiency of the appliances for distributing the seed, retain the grain-tubes securely in place, and enable the devices to be adjusted to regulate the discharge of grain within desirable limits.

With these ends in view the invention consists in the novel construction, combination, and arrangement of parts, which will be hereinafter fully described and claimed.

Figure 1:
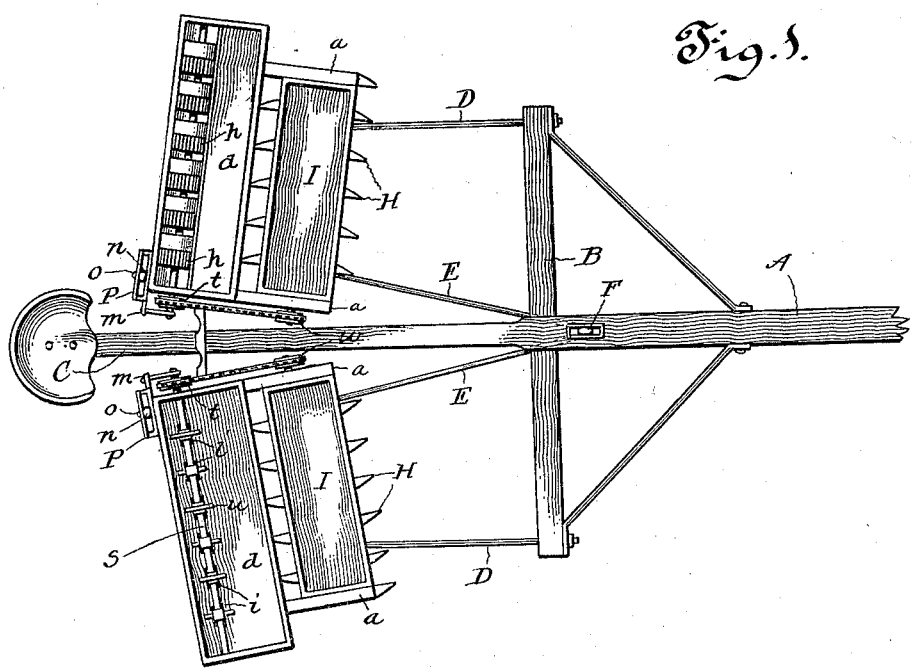
Figure 2:
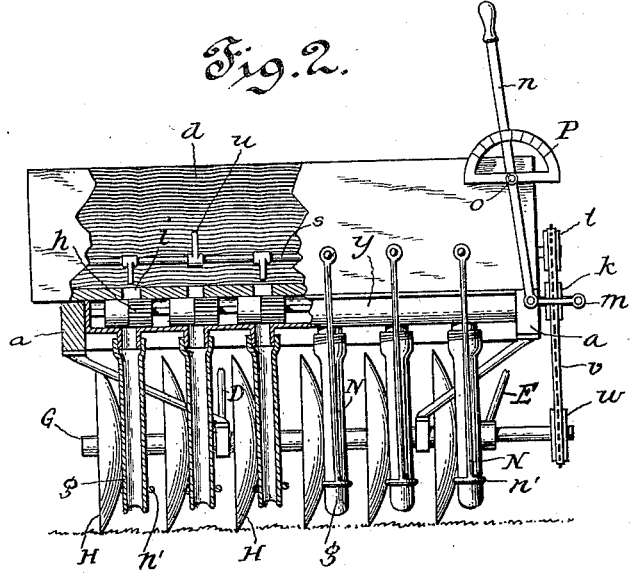

In the drawings, Figure 1 is a plan view of a combined harrow and planter embodying our improvements. Fig. 2 is a rear elevation, on an enlarged scale, partly broken away and in section, of one of the hoppers and harrow-sections. Fig. 3 is a vertical longitudinal section through one of the harrow-sections and the seeding devices associated therewith. Fig. 4 is a sectional elevation taken centrally through the machine and showing one harrow-section and the seeding devices thereon in end view.

The same letters of reference are used to indicate like and corresponding parts in the drawings.

The general structure of the machine is similar to the combined harrow and planter disclosed by our former patent, to which reference has been made, and it includes the draft-tongue A, provided with the cross-beam B.

C is the seat-bar, fixed to the framework and carrying a seat at its upper rear end.

D D are the draft-links, connected to the beam B and the outer ends of the harrow-axles, and E E are the movable draft-links, which are connected to the inner ends of the harrow-axles, said movable links being connected pivotally with a lever F, which is fulcrumed on the draft-beam A. The harrow-axles G are arranged on opposite sides of the line of draft and inclined reversely to each other. Said axles carry the harrow-disks H, arranged in gangs in the usual way, and over these harrow-disks are the horizontal weight-boxes I, said weight-boxes being connected by suitable standards with the axles of the harrow-disks. Extending rearwardly from the weight-boxes are the frames $a$, each supporting a seed-hopper $d$, said seed-hopper being thus disposed in rear of the gang of harrow-disks and the weight-box and in a horizontal plane above the latter. Each frame, with the seed-hopper, is braced by the employment of arms $b$, which are attached to the frame and connected with the harrow-axle or the standards which support the weight-box I. Each hopper is provided near its rear edge with a series of grain-openings $i$ in the bottom thereof, whereby the grain-openings lie at the rear of the hopper instead of centrally therein, as disclosed by our former patent. To the under side of each hopper is secured a series of seed-cups $y$, which are located near the rear edge of the hopper in positions to register with the grain-openings $i$ in the bottom thereof, each seed-cup having a short nozzle extending from the under side thereof. A force-feed shaft, square in cross-section, extends through the entire series of seed-cups on each hopper, said shaft being journaled in proper bearings provided by the seed-cups, and to said shaft is fitted a series of force-feed wheels $h$. A feed-wheel is located in each seed-cup to operate in the chamber thereof and to rotate with the shaft, so as to regulate the quantity of grain which may pass through the opening $i$ to the spout or tube $g$. The feed-wheels constituting the series on each shaft are connected thereto so as to move endwise with the shaft and vary the area of the feed-wheel presented to the chamber of the seed-cup, said shaft and the series of feed-wheels thereon being movable endwise in a well-known manner for regulating the quantity of grain which may be discharged by the feed-wheels through the seed-cups and the grain spouts or tubes. The inner end of each force-feed shaft extends beyond the corresponding end of the hopper for the reception of a sprocket-wheel $k$, (see Fig. 4,) which is preferably fitted slidably to the polygonal shaft. As a means for adjusting the feed-shaft and the wheels thereon we provide a segment P and lever $n$. The segment is fixed to the rear side of the seed-hopper in position to receive the fulcrum $o$, which attaches the lever $n$ to the segment and the seed-hopper. This lever is fulcrumed at a point intermediate of its length, and its lower end is pivoted to a link or arm $m$, which connects with the inner end of the force-feed shaft in a suitable way. The force-feed shaft is free to rotate, but the link $m$ is connected with this shaft so as to move it and the series of feed-wheels endwise.

A rotary agitator-shaft $s$ is journaled in proper bearings in the end walls of the seed-hopper, said shaft extending through the seed-hopper in the vertical plane of the openings $i$ in the bottom thereof. The shaft carries a series of fingers $u$, which are fastened to said shaft in positions to sweep over the grain-openings $i$ in the bottom of the hopper, the alternate fingers on the shaft extending in opposite directions therefrom, as shown by Fig. 2. One end of the agitator-shaft extends from the inner end of the seed-hopper to receive a sprocket-wheel $t$, and as the agitator-shaft is in the vertical plane of the force-feed shaft the sprocket-wheels $k$ $t$ on the two shafts lie directly one above the other. The axle of each gang of harrow-disks is provided at its inner end with a sprocket $w$, with which engages an endless sprocket-chain $v$, the latter also engaging with the sprocket-wheels $k$ $t$, as shown by Fig. 4, so that the motion of the axle G when the machine is in operation will be communicated by the chain to the force-feed shaft and the agitator-shaft, thereby rotating both shafts from a common source of power.

The grain tubes or spouts $g$ are expanded or slipped over the nozzles on the lower end of the seed-cups $y$, as shown by Fig. 3, and the series of grain-tubes on each hopper have their lower ends curved toward the gang of harrow-disks, so as to terminate in proper relation thereto. With each seed-tube is engaged a clip $n'$, the latter being attached to the lower end of a hanger N, which is secured in a suitable way to the rear side of the seed-hopper. The hangers and clips retain the seed-tubes in proper positions, while allowing them to move or play within certain desirable limits.

Changes may be made in the form and proportion of some of the parts, while their essential features are retained and the spirit of the invention embodied. Hence we do not desire to be limited to the precise form of all the parts as shown, reserving the right to vary therefrom.

Having thus described the invention, what we claim is—

1. A combined harrow and seeder comprising a suitable frame, the axles carrying the gangs of harrow-disks and each axle provided with a sprocket-pinion, the seed-hoppers having the seed-cups, a force-feed shaft extending through the cups and provided with the feed-wheels and the sprocket, an agitator-shaft extending through the hopper and having the fingers and the sprocket-wheel, and endless sprocket-chains connecting the harrow-axles with the force-feed shafts and the agitator-shafts, substantially as described.

2. A combined harrow and seeder comprising a frame, the axles carrying the gangs of harrow-disks and provided at their inner ends with the sprockets, hoppers having the grain-openings near the rear edge of the bottom thereof, the seed-cups fixed to the bottom of each hopper and having the nozzles, a force-feed shaft extending through the seed-cups and having a sprocket and the feed-wheels, an agitator-shaft extending through the hopper over the grain-openings and provided with the fingers and with a sprocket, endless chains connecting the harrow-axles with the force-feed shaft and the agitator-shaft, the grain-tubes fitted to the nozzles of the seed-cups, and hangers attached to the hoppers and provided with clips which engage with the grain-tubes, substantially as described.

In testimony that we claim the foregoing as our invention we have hereunto affixed our signatures in the presence of two witnesses.

JONATHAN JUDSON ROGERS.
OLIVER SYLVESTER KENNEDY.

Witnesses:
 H. G. LANE,
 B. J. HOUSTON.